(12) United States Patent
Moldenhauer

(10) Patent No.: US 9,933,545 B2
(45) Date of Patent: Apr. 3, 2018

(54) USE OF ATOMIC OPTICAL CLOCKS FOR GRAVITATIONAL SURVEYS

(75) Inventor: Karsten Moldenhauer, Lower Saxony (DE)

(73) Assignee: BAKER HUGHES, LLC, Houston, TX (US)

(*) Notice: Subject to any disclaimer, the term of this patent is extended or adjusted under 35 U.S.C. 154(b) by 1248 days.

(21) Appl. No.: 13/428,521

(22) Filed: Mar. 23, 2012

(65) Prior Publication Data

US 2013/0080064 A1 Mar. 28, 2013

Related U.S. Application Data

(60) Provisional application No. 61/467,431, filed on Mar. 25, 2011, provisional application No. 61/511,683, filed on Jul. 26, 2011.

(51) Int. Cl.
*G01V 7/06* (2006.01)
*G01V 7/00* (2006.01)

(52) U.S. Cl.
CPC . *G01V 7/06* (2013.01); *G01V 7/00* (2013.01)

(58) Field of Classification Search
CPC .................................. G01V 7/00; G01V 7/06
USPC ........................................................... 702/11
See application file for complete search history.

(56) References Cited

U.S. PATENT DOCUMENTS

| | | | |
|---|---|---|---|
| 3,127,950 A * | 4/1964 | Itria | G01V 1/50 367/26 |
| 3,747,403 A * | 7/1973 | Yungul | G01V 7/00 73/152.02 |
| 3,960,344 A * | 6/1976 | Dugan | G01V 7/16 244/177 |
| 4,384,487 A | 5/1983 | Browning | |
| 4,419,891 A | 12/1983 | Browning | |
| 4,992,656 A * | 2/1991 | Clauser | G01C 19/58 250/251 |
| 5,420,549 A * | 5/1995 | Prestage | H03L 7/26 324/304 |
| 6,125,698 A | 10/2000 | Schweitzer et al. | |
| 6,772,630 B2 | 8/2004 | Araya | |
| 7,558,157 B1 | 7/2009 | Gardner et al. | |
| 2004/0000910 A1* | 1/2004 | Tryggvason | G01V 11/00 324/331 |
| 2005/0088660 A1* | 4/2005 | Ronnekleiv | G01B 9/02007 356/478 |

(Continued)

OTHER PUBLICATIONS

OST, NIST's Second Quantum Logic Clock Based on Aluminum Ion is Now World's Most Precise Clock, Feb. 4, 2010 (Feb. 2010) [retrieved on May 8, 2012. Retrieved from the internet:,URL:http://www.nist.gov/pml/div688/logicclock_02410.cfm.
Notification of Transmittal of the International Search Report and the Written Opinion of the International Searching Authority, or the Declaration; PCT/US2012/030339; dated Oct. 31, 2012.

*Primary Examiner* — Manuel L Barbee
*Assistant Examiner* — Yaritza H Perez Bermudez
(74) *Attorney, Agent, or Firm* — Cantor Colburn LLP

(57) ABSTRACT

A method of estimating a parameter of an anomaly in an earth formation includes: disposing a measurement device at at least one measurement location, the measurement device including a frequency standard; estimating a frequency shift of a frequency standard due to a gravitational potential at at least one measurement location; and deriving a relationship between a mass and a depth of a formation anomaly at a distance to the at least one measurement location using the frequency shift.

35 Claims, 3 Drawing Sheets

(56) References Cited

U.S. PATENT DOCUMENTS

| | | | |
|---|---|---|---|
| 2006/0285437 A1* | 12/2006 | Sinha | G01V 1/50 367/37 |
| 2008/0015803 A1* | 1/2008 | Niebauer | G01V 13/00 702/85 |
| 2008/0271533 A1* | 11/2008 | Csutak | E21B 47/04 73/514.27 |
| 2009/0044618 A1* | 2/2009 | DiFoggio | G01V 7/00 73/152.59 |
| 2009/0216451 A1* | 8/2009 | Barnes | G01V 7/00 702/5 |
| 2009/0223291 A1* | 9/2009 | Donadille | E21B 43/16 73/32 R |
| 2009/0235732 A1* | 9/2009 | DiFoggio | E21B 47/04 73/152.46 |
| 2009/0235740 A1* | 9/2009 | Carr | G01V 7/00 73/382 R |
| 2009/0252372 A1* | 10/2009 | Davies | G01V 7/06 382/100 |
| 2009/0287464 A1* | 11/2009 | Barnes | G01V 7/06 703/2 |
| 2010/0071461 A1* | 3/2010 | Beverini | G01V 7/005 73/382 R |
| 2010/0161226 A1* | 6/2010 | Homan | G01V 7/00 702/8 |
| 2010/0206557 A1* | 8/2010 | Davies | G01V 11/00 166/250.01 |

* cited by examiner

USE OF ATOMIC OPTICAL CLOCKS FOR GRAVITATIONAL SURVEYS

REFERENCE TO RELATED APPLICATIONS

This application claims the benefit of an earlier filing date from U.S. Provisional Application Ser. No. 61/467,431 filed Mar. 25, 2011, and U.S. Provisional Application Ser. No. 61/511,683, filed Jul. 26, 2011, both entitled "USE OF ATOMIC OPTICAL CLOCKS FOR GRAVITATIONAL SURVEYS", the entire disclosures of which are incorporated herein by reference.

BACKGROUND

Gravitational surveying is one technique used for geophysical exploration, and is often used on a large scale before seismic technologies are applied. Precise gravity surveys allow a measurement of anomalies of the subsurface density introduced by certain geological structure (e.g. salt domes, faults, iron ore deposits, etc.). Gravitational surveying is used for purposes such as oil exploration, mineral exploration and oil and gas reservoir monitoring.

SUMMARY

A method of estimating a parameter of an anomaly in an earth formation includes: disposing a measurement device at at least one measurement location, the measurement device including a frequency standard; estimating a frequency shift of a frequency standard due to a gravitational potential at at least one measurement location; and deriving a relationship between a mass and a depth of a formation anomaly at a distance to the at least one measurement location using the frequency shift.

A system for gravitational survey includes: a measurement device including a frequency standard configured to be disposed at at least one measurement location, the frequency standard having a frequency that shifts in response to a change in gravitational potential; and a processor for receiving a frequency shift of the frequency standard, and deriving a relationship between a mass and a depth of a formation anomaly at a distance to the at least one measurement location using the frequency shift.

BRIEF DESCRIPTION OF THE DRAWINGS

The following descriptions should not be considered limiting in any way. With reference to the accompanying drawings, like elements are numbered alike.

DETAILED DESCRIPTION

There is provided systems, apparatuses and methods for gravitational surveying of subterranean formations and/or anomalies. Examples of such anomalies include hydrocarbon reservoirs, geologic formations, salt domes, faults and others. A gravitational surveying system includes at least one frequency standard to measure a frequency shift due to a gravitational potential. In addition, the gravitational surveying system can include a gravimeter configured to measure gravitational acceleration. In one embodiment, the frequency standard has a frequency that is comparable to a reference frequency standard. In one embodiment, the frequency standard and/or the reference frequency standards include a frequency standard clock and a reference clock such as an optical clock. The system may be disposed at one or more surface locations and/or at one or more locations above or below the surface, e.g., on an aircraft or ocean-going vessel. For example, the system is disposed at or above a surface location, or otherwise disposed some distance from a formation. In one embodiment, a gravitational measurement unit includes at least one gravimeter and at least one frequency standard clock. A method of gravitational surveying includes measuring a gravitational acceleration via the gravimeter at a location at, above or below a surface location, measuring a frequency shift of a clock at, above or below the location, and analyzing the measurements to estimate a mass and/or a depth of an anomaly. In one embodiment, the frequency shift is measured relative to a reference clock.

Figure 1:
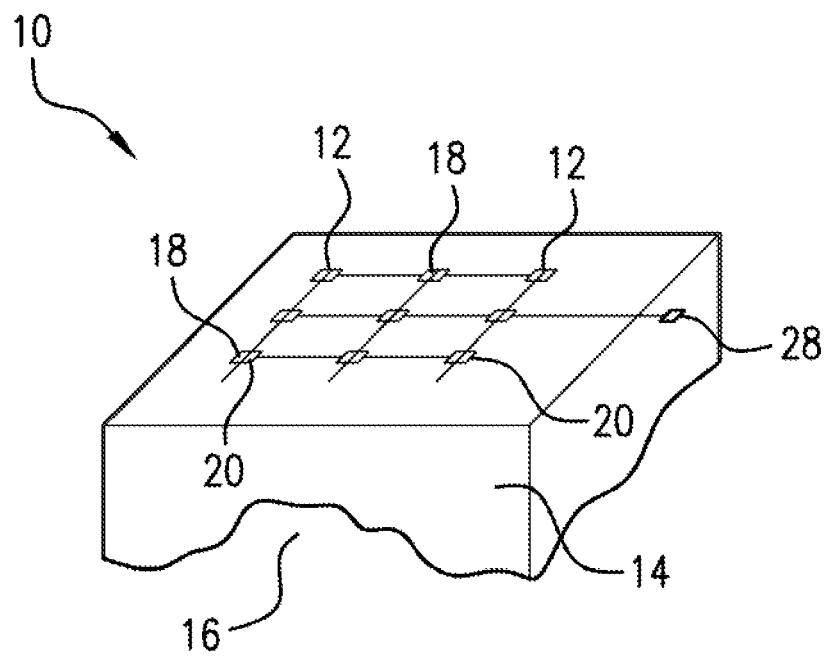
FIG. 1 depicts an exemplary embodiment of a gravitational surveying system.

Referring to FIG. 1, an exemplary embodiment of a gravity surveying system 10 includes one or more measurement locations 12 disposed at a surface of an earth formation 14 for estimating the position (e.g., depth and lateral location) and the mass of a subterranean anomaly 16. As described herein, an "anomaly" refers to any geologic formation, density variation, reservoir or other feature in the formation that result in a change in the gravitational field. Examples, of anomalies include salt domes, faults, fractures and hydrocarbon reservoirs. The surveying system 10 includes one or more frequency standards 20, and may also include one or more gravitational acceleration measurement devices such as gravimeters 18 and. In one embodiment, the frequency standards 20 are configured as clocks, such as atomic clocks and/or optical clocks. A frequency standard as described herein refers to any stable oscillator, which may or may not be fixed to a set standard. In one embodiment, the system is used in conjunction with a plurality of laterally arrayed measurement locations 12. The gravimeters 18 may be placed at a plurality of the measurement locations 12, or gravimeters 18 may be moved between measurement locations to generate data for each location 12. Likewise, the clocks 20 may be placed at a plurality of the measurement locations 12, or clocks 20 may be moved between measurement locations to generate data for each location 12. The clocks described herein may include any type of oscillator that may or may not be referenced to a frequency standard. A frequency standard includes an oscillator having a known frequency. Such frequency standards may be included in a clock that generates a corresponding time value based on the frequency. Exemplary frequency standards include atomic frequency standards such as cesium frequency standards and optical frequency standards. Description of clocks herein should be considered to include any device having a frequency standard oscillator.

As described herein, a "surface" location is a point located on or above the surface of an earth formation, which may include a land or subsea location. The surface location can include any location at or above the surface and having the same lateral location. A lateral location refers to a location of a point on a plane at least substantially perpendicular to a line parallel to a direction of the true vertical depth (TVD).

The true vertical depth (TVD) of a point is the depth to that point measured on a line connecting the point to the center of the earth.

Gravimeters are configured to measure the acceleration due to gravity, which is equal to the gradient of the gravitational potential energy. Gravimeters are often used for two-dimension mapping of the acceleration in gravitational surveys. Any suitable gravimeters may be used, including various spring-type gravimeters and superconducting gravimeters. Gravimeters may include absolute gravimeters and relative gravimeters that are used in conjunction with one or more reference gravimeters located remotely from each relative gravimeter.

Exemplary clocks include timing devices that incorporate a stable oscillator or frequency standard whose oscillation or "tick" frequency is affected by local gravity. Frequency standard clocks may include atomic clocks, which use an electronic transition frequency and the frequency of signals that are emitted by the electron transition in atoms as frequency standard. In one embodiment, frequency standard clocks include optical clocks or nuclear clocks. Atomic clocks, optical clocks, and nuclear clocks are sensitive to the potential energy within a gravity field. This is due to the gravitational frequency red shift as described by general relativity. Gravitational anomalies (e.g. salt domes, faults, reservoirs) can thus be detected by frequency shifts of a frequency standard. The frequency shift, in one embodiment, is measured by comparison with a reference frequency standard which is a second frequency standard at a reference location via, for example, a telecommunication fiber. The second frequency standard may be included in a second clock or reference clock.

The frequency shift of the reference frequency standard at a reference position is known. By combining the known frequency shift of the reference frequency standard and the frequency shift between the frequency standard and the reference frequency standard, the absolute frequency shift of the frequency standard due to the local gravity potential at the position of the frequency standard can be derived.

In aerial surveys, the frequency shift can be compared by communication with a reference clock at a ground location via, for example, a laser beam. By measuring the clock shift at various positions, a two-dimensional map of the local gravity potential can be acquired.

An exemplary atomic clock is a Rubidium 87 atomic clock, which operates at a frequency of 6.834 GHz line and has a short term frequency accuracy of about $3 \times 10^{-12}$. Optical clocks, which are relatively new, are currently increasing their accuracy at an even faster speed and have already surpassed microwave clocks. "Optical clock" refers to an atomic clock that is synchronized to an optical-frequency atomic electron transition. An exemplary optical clock is the National Institute of Standards and Technology (NIST) optical clock, such as the NIST clock based on the Mercury 199 ion, which has a frequency accuracy of about $8 \times 10^{-17}$. Another example is NIST's so-called "quantum logic clock" based on an aluminum ion which has a frequency accuracy of about $8 \times 10^{-18}$. The optical clock may be compared to an atomic clock, which is synchronized to a lower microwave-frequency atomic electron transition. Optical clocks oscillate about 100 thousand times faster than do microwave atomic clocks, so they have far higher resolution and precision.

In one embodiment, the optical clock includes an optical "frequency comb" to convert optical "ticks", i.e., oscillations, to microwave frequency "ticks" so that they can be counted. The frequency comb may take the form of a self-referenced, mode-locked laser to bridge the gap between radio frequency, which can be counted by present-day electronic circuits, and optical frequencies, which cannot be counted by present-day electronic circuits. The frequency comb thus compensates for the inability of existing electronics to directly count at optical frequencies. A conceptually-helpful mechanical analogue for the frequency comb technique is gear reduction, which is accomplished using meshed gears that have different radii and so rotate at different speeds but still remain locked in synchrony.

The clocks are not limited to those described herein. Any clock having a sufficient frequency accuracy to determine frequency shifts may be used. Other examples of clocks include nuclear clocks, lattice clocks, clocks based on single or multiple ions, THz-clocks, UV-clocks or clocks at even higher frequencies.

Figure 2:
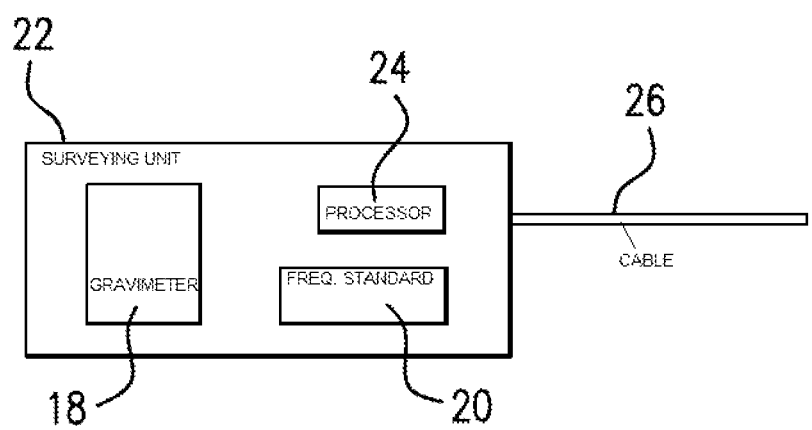
FIG. 2 depicts an exemplary embodiment of a gravitational measurement unit.

Referring to FIG. 2, an exemplary embodiment of a gravity surveying unit 22 that includes at least one gravimeter 18 and at least one optical clock 20. As described herein, an optical clock includes a frequency standard which can be any stable frequency standard as discussed above. One or more processing devices 24 are operably connected to the gravimeter 18 and/or the optical clock 20 including the frequency standard, and are configured to receive signals or data from the gravimeter 18 and optical clock 20. The processing device 24 includes sufficient processors, memory and/or other components configured to store, process and/or analyze the data. In one embodiment, a transmission device such as an optical fiber communication cable 26 is operably connected to at least one reference frequency standard 28 so that the reference frequency generated by the reference frequency standard 28 can be compared to the shifted frequency to generate the frequency shift data. The reference frequency standard 28 may be compared to the clock(s) 20 (e.g., via a frequency comb and transfer laser) during or prior to commencing a gravitational survey. In one embodiment, if the drift between two measurements at different positions is small compared to the shift due to the different local gravities, the reference clock may not be required.

In one embodiment, the gravity surveying unit utilizes an optical clock as an accelerometer. For example, a frequency standard may be used as both a clock, measuring oscillations of excited atoms, and also may be used as an accelerometer.

In one example, the gravity surveying unit 22 includes components that are utilized as both a clock and an accelerometer. The unit 22 in this example includes a frequency standard 20 having, e.g., a stable laser and a vacuum chamber in which atoms are excited. The gravity surveying unit 22 may utilize one or more components of the optical clock for acceleration measurements. These components can for example be a laser (e.g., an ultrastable clock laser), the vacuum chamber, the atomic oscillator source or an atom interferometer. The oscillations of the atoms can be used to measure both acceleration and frequency shift, and thus the same frequency standard components can be used as both a clock and an accelerometer.

For example, the atom interferometer can be switched from a clock configuration to an accelerometer configuration. This way, both clock and accelerometer can be realized with the same measurement instrument in different configuration.

One or more of the gravimeter 18, the clock 20 and the reference clock 28 may be operably connected to a processing unit, which can act to control the gravimeter 18, the clock 20 and/or the reference clock 28, and may also collect and process data generated by gravimeter 18, the clock 20 and the reference clock 28 during a gravitational survey. The processing unit may be included as part of a measurement unit 22 (e.g., as part of the processor 24), may be included as part of individual gravimeters 18 and/or clocks 20, or may be remote unit connected to one or more gravimeters 18, clocks 20 and reference clocks 28. The processing unit may also include components as necessary to provide for processing of data from the tool 18. Exemplary components include, without limitation, at least one processor, storage, memory, input devices, output devices and the like. Other components include a position determination device, such as a global positioning system (GPS) device, that is configured to measure a lateral location as well as a height above or below the surface. The position determination device may be used to estimate the depth or height of the surveying unit so that the mass of the earth surrounding the anomaly (which can influence the frequency of the frequency standard) can be accounted or corrected for. As these components are known to those skilled in the art, these are not depicted in any detail herein.

In one embodiment, the clock 20 is disposed at a subterranean location. For example, a clock 20 for a given measurement location may be inserted into a borehole by, for example, lowering the clock by a wireline or other suitable carrier. The clock 20 can thus not only be placed above the surface but in the borehole as well (e.g., above, within or under the anomaly) to improve three-dimensional mapping of gravity. Accordingly, the measurement location may be any location disposed within and/or at some distance from the anomaly that is close enough so that the clock and/or frequency standard "sees" the anomaly, i.e., is affected by the anomaly.

Figure 3:
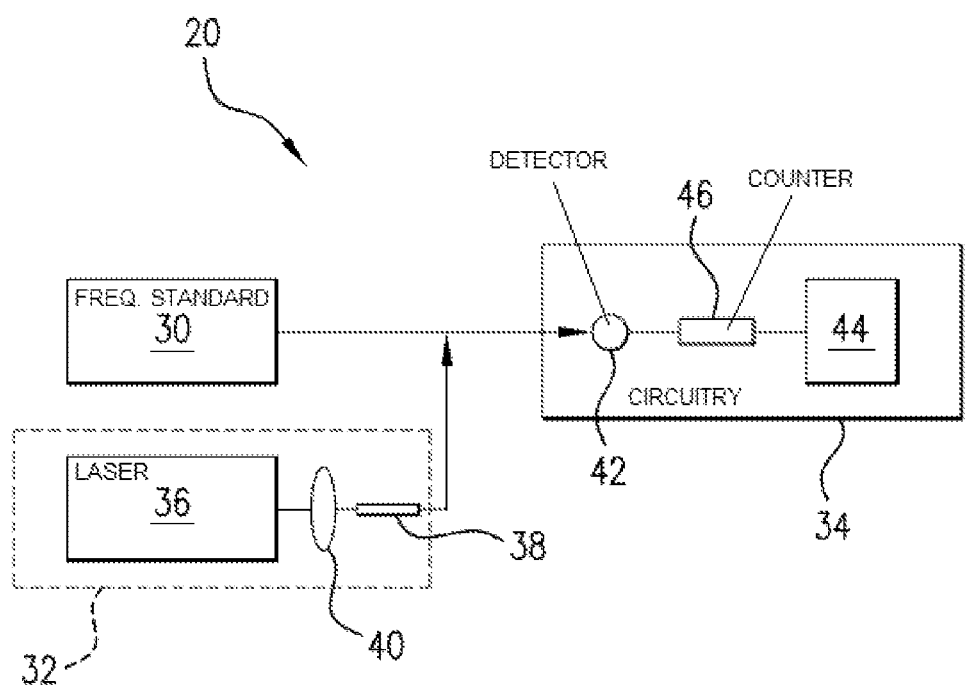
FIG. 3 depicts an exemplary embodiment of a clock used in conjunction with the systems and methods described herein.

Referring to FIG. 3, an exemplary clock 20 configured as an optical clock is shown. The exemplary clock 20 includes an optical frequency standard 30, a frequency comb 32, and processing circuitry 34. The frequency comb 32 includes a light source, such as a mode-locked femtosecond laser 36 having a selected frequency and a pulse duration in the femtosecond range. An example of the femtosecond laser 36 is a titanium sapphire laser. The femtosecond laser 36 output may be coupled to an optical fiber 38 via a lens 40. In use, the light output from the optical frequency standard 30 may be added to the beam produced by the frequency comb 32, which is then fed to one or more detectors 42, which are in turn connected to suitable circuitry 44 and/or any other components to convert the optical frequency ticks to microwave frequency ticks which can be counted. For example, the detector 42 may output beat patterns that are measured by a counter 46. The circuitry 44 may include any suitable components for measuring and outputting the frequency of the optical standard 30, such as various gratings, detectors, counters and other components.

Figure 4:
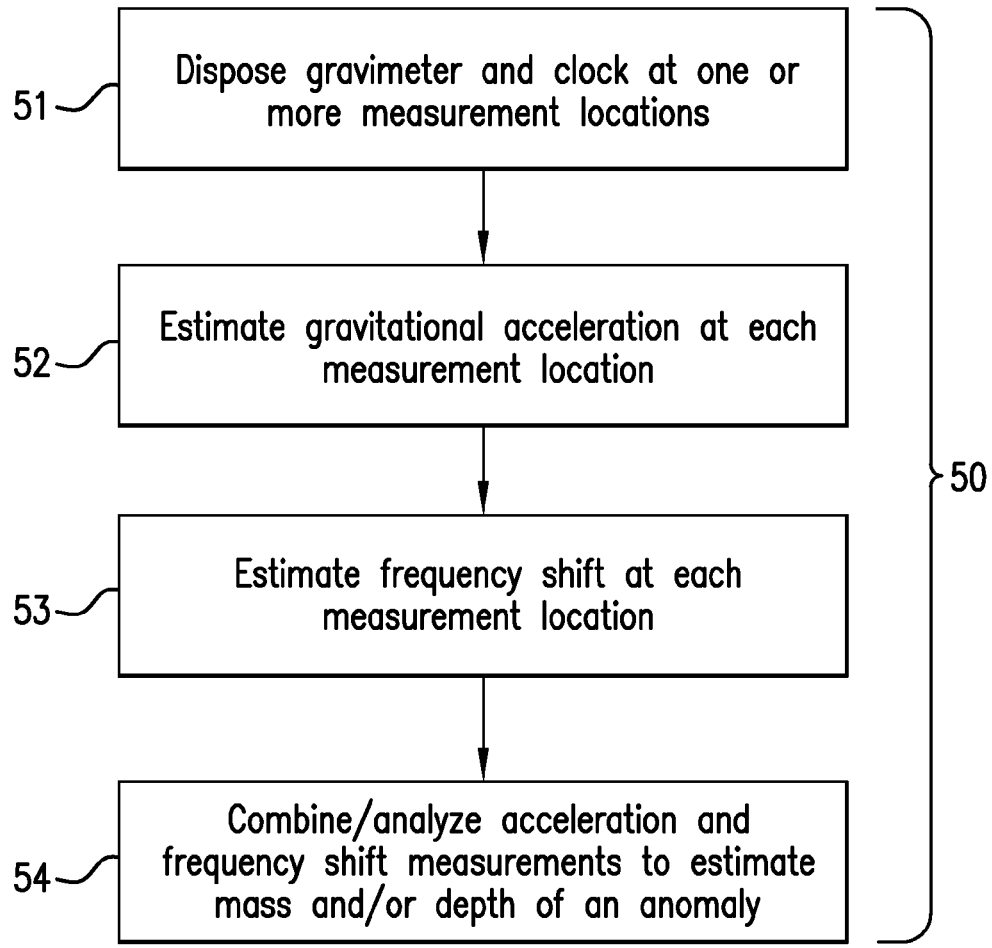
FIG. 4 is a flow chart providing an exemplary method for measuring a mass and/or depth of a gravitational anomaly.

FIG. 4 illustrates a method 50 for performing a gravitational survey of an earth formation. The method 50 includes one or more stages 51-54. The method 50 is described herein in conjunction with the clock 20 and the reference clock 28, which in one embodiment are both optical clocks, and the gravimeter 18, although the method 50 may be performed in conjunction with any number and configuration of measurement devices configured to separately measure gravitational acceleration and frequency shift. In one embodiment, the method 50 includes the execution of all of stages 51-54 in the order described. However, certain stages may be omitted, stages may be added, or the order of the stages changed.

In the first stage 51, at least one gravimeter 18 and/or at least one frequency standard 20 are configured to take measurements at one or more surface locations. In one embodiment, a plurality of surface locations are positioned laterally in an array so that a gravitational map of a formation area can be generated. The gravimeter 18 and/or the clock 20 may be disposed as units (e.g., measurement unit 22), one of each located at a respective measurement location, or they can be moved to different locations and measurements taken during a given period of time. In one embodiment, the measurement unit may include one or more measurement devices that can be switched between a clock and an accelerometer configuration. This holds the additional advantage that the spatial separation between gravimeter and clock is minimized and associated errors are reduced or minimized. In one embodiment, the frequency shifts at each measurement location are measured with respect to the reference frequency standard at another location.

In the second stage 52, gravitational acceleration measurements are collected. In one embodiment, each measurement corresponds to data received from each of the plurality of measurement locations in the survey array, and thus each acceleration measurement can be correlated to a (lateral) location. In one embodiment, one or more gravimeters 18 are disposed on a moving vessel (e.g., an aircraft), and multiple measurements are taken over time which can be correlated to a lateral location above the surface. Gravitational acceleration measurements may be taken via measurement devices that can be switched between a clock and an accelerometer configuration.

For a simplified assumption of a point mass the measured acceleration can be used to estimate a combination of mass and a depth of the anomaly, based on the following relationship:

$$\vec{a} = \frac{\vec{F}}{m} = -GM\frac{\vec{r}}{|\vec{r}|^3},$$

where "$\vec{a}$" is a vector measurement of the acceleration (neglecting the acceleration of the surrounding mass of the earth), "M" is the mass of an object (e.g., the anomaly), "$|\vec{r}|$" is the distance between a sensor (e.g., a gravimeter 18) and the object (norm of the distance vector $\vec{r}$), m is a test mass in the accelerometer, and "G" is the gravitational constant (G=6.67384(80)×10^-11 N(m/kg)^2). In the case of a gravimeter disposed at a surface location, the distance "r" indicates a depth of the anomaly. The point mass is only used as an example to illustrate the measurement scheme. Real formations with more complicated mass distributions may be calculated by computer models, e.g., based on the relationships described herein.

In the third stage 53, frequency shift measurements are collected. In one embodiment, each measurement corresponds to data received from each of the plurality of measurement locations in the survey array, and thus each frequency shift measurement can be correlated to a location. In one embodiment, one or more clocks 20 are disposed on a moving vessel (e.g., an aircraft), and multiple measurements are taken over time which can be correlated to a lateral location above the surface.

In one embodiment, frequency shifts for each measurement location of a clock 20 relative to a reference clock 28 are recorded and/or estimated. Measured frequency shifts above a selected threshold can be considered to indicate an anomaly, and the locations of such measured shifts can indicate the lateral extent of the anomaly. In one embodiment, the measured shifts are correlated to a geologic model or other data based on past measurements or known information.

In one embodiment, the measured frequency shifts are estimated as a "relative frequency shift" which is given as a ratio of the frequency shift ("$\Delta f$") over the oscillation frequency ("f") of the clock. The frequency shift $\Delta f$ between two frequency standards at which have a difference in gravitational potential ($\Delta \Phi$) is related by the following equation:

$$\frac{\Delta f}{f} = \frac{\Delta \Phi}{c^2},$$

where "$\Delta f/f$" is the relative frequency shift, "$\Delta \Phi$" is the difference in the gravitational potential and "c" is the speed of light. In one embodiment, one frequency standard is a reference frequency standard with a well known frequency shift due to the local gravitational potential at the location of the reference frequency standard.

The frequency shift due to the gravitational potential of the reference frequency standard at a reference position is known. By combining the known frequency shift of the reference frequency standard and the frequency shift between the frequency standard and the reference frequency standard, the absolute frequency shift $\Phi$ of the frequency standard due to the local gravity potential at the position of the frequency standard can be derived. The formula then allows for determination of the total frequency shift "$\Delta F$" and not only the differential frequency shift between the two frequency standards.

A relationship, such as a functional relationship, between a mass and a depth (or other distance from a measurement location) of a formation anomaly can be derived using the frequency shift. This relationship can be derived from the frequency shift alone, or from a combination of the frequency shift and gravitational acceleration.

In one embodiment, the functional relationship is expressed by an analytical equation and one or more parameters of the equation are determined by the frequency shift at a measurement location. A plurality of measurement locations such as an array of measurements may be used to generate a functional relationship with more than one parameter to achieve higher accuracy of mass and depth estimations. The functional relationship may be expressed in various forms, such as via one or more equations, a table or a computer model of geological structures.

In one embodiment, the relationship is derived by expressing the anomaly is a point mass or a combination of point masses. However, this expression is not so limited, as the anomaly can be expressed as any suitable volume having some selected shape or geometry.

For a point mass, the gravitational potential is determined by the relationship of the mass and the depth of the mass:

$$\Phi = -\frac{GM}{|\vec{r}|}$$

where "M" is the mass of an object (e.g., the anomaly) and the norm of the distance vector "$\vec{r}$" is the distance between a sensor (e.g., accelerometer, frequency standard, and/or clock 20) and the object. In the case of a surface sensor 20, this distance indicates a depth of the anomaly.

In the fourth stage 54, frequency measurements from the clock 20 and the gravimeter 18 at each measurement location are combined to estimate additional information regarding the anomaly. For example, these measurements can be combined and analyzed to estimate both a mass and a distance or depth of the anomaly. As discussed above and demonstrated by the above equations, either frequency measurements or gravitational acceleration measurement are not sufficient in themselves to estimate both mass and depth, but only yield possible combinations (pairs of mass and depth). The combination of these measurements allows an estimation of both, as acceleration (measured via gravimeter and/or frequency shift) and gravitational potential (measured by frequency shift) are differently dependent on depth of a mass.

The acceleration $\vec{a}$ generated by a point mass M may be given as:

$$\vec{a} = \frac{\vec{F}}{m} = -GM\frac{\vec{r}}{|\vec{r}|^3}$$

In one embodiment, this acceleration is compared to the detection limit of the gravimeter, typically given in Gal (1 Gal=1 cm/s$^2$).

For the point mass, acceleration can be represented as:

$$a = |\vec{a}| = -GM\frac{1}{|\vec{r}|^2} \text{ (see above)}$$

and the frequency shift ratio can be represented as:

$$\frac{\Delta f}{f} = \frac{\Phi}{c^2} = -\frac{GM}{|\vec{r}|c^2} \text{ (see above)}$$

From these equations, the following relationship follows:

$$\frac{\Delta f/f}{a} = \frac{1}{c^2}|\vec{r}|$$

and therefore:

$$|\vec{r}| = c^2 \cdot \frac{\Delta f/f}{a}.$$

The quotient $$"\frac{\Delta f/f}{a}"$$

is the ratio between me measurement signals of the two devices (i.e., the measurement signal from the frequency standard shift due to gravitational potential and the measurement signal from the gravimeter). Thus, the stage includes calculating the distance $|\vec{r}|$ of the measurement devices to the point representing the anomaly based on this ratio. After the distance has been calculated, the mass can be calculated from either the signal of the accelerometer or the frequency standard, such as by:

$$M = -\frac{a}{G}|\vec{r}|^2 \text{ (accelerometer)}$$

or $$M = -\frac{\Delta f}{f} \cdot \frac{|\vec{r}|c^2}{G} \text{ (clock).}$$

In one embodiment, the above calculations are made assuming a point mass where the mass of the surrounding earth is neglected. In other embodiments, a computer model of geological structures may be used to compute the results for the formation and also to compensate for the effect of the surrounding mass. The above formulas may be used as a basis of this model. For example, the mass distribution can be modeled as a distribution of multiple point masses which each for themselves fulfill the above equations.

In one embodiment, in stage 51 only a clock is disposed, without a gravimeter. In this embodiment, stage 52 and 54 are omitted. Stage 53 then yields a relationship of mass and depth of the anomaly.

The systems and methods described herein provide various advantages over existing processing methods and devices. For example, surveys of standard gravimeters are combined with measurements from optical atomic clocks, which yields information not only on the lateral extent of a formation/anomaly but also its depth and mass, even when all sensors are operated above the earth surface. Thus, more accurate surveys can be performed without the need to drill.

A single measurement with only one type of device (gravimeter or frequency standard clock) only would not be able to separate mass and distance of the anomaly. A near, low-mass anomaly cannot be distinguished from a distant but high-mass anomaly. The combination of both measurement principles allows a differentiation between the two types of anomalies.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a parameter of an anomaly in an earth formation, comprising:
    performing a gravitational survey of a subsurface earth formation as part of a subterranean exploration operation, wherein performing includes:
    disposing a measurement device in at least one measurement location, the measurement device including a frequency standard oscillator assembly configured to oscillate at a stable frequency and a gravimeter configured to measure a gravitational acceleration, the frequency standard oscillator assembly including an optical frequency standard configured to emit an optical signal, the optical frequency standard being sensitive to potential energy within a gravitational field and having an oscillation frequency that shifts based on the potential energy, and a detector configured to detect the optical signal;
    measuring the gravitational acceleration at the at least one measurement location;
    measuring the oscillation frequency of the optical frequency standard based on the optical signal at the at least one measurement location;
    estimating a frequency shift of the oscillation frequency due to the potential energy at the at least one measurement location; and
    receiving the gravitational acceleration and the frequency shift at a processor, and estimating a distance between the at least one measurement location and a location of a formation anomaly based on a ratio between the frequency shift and the gravitational acceleration.

2. The method of claim 1, wherein estimating includes deriving a relationship between a mass of the anomaly and the distance based on the frequency shift, the relationship relating the frequency shift to a ratio between the mass and the distance.

3. The method of claim 2, wherein the relationship is a functional relationship expressed by an analytical equation and a parameter of the equation is determined by the frequency shift at the measurement location.

4. The method of claim 2, wherein the measurement device is configured to combine the optical signal emitted by the optical frequency standard with a pulsed laser, and the pulsed laser is configured as a frequency comb to convert a frequency of the optical signal to a lower frequency.

5. The method of claim 2, wherein deriving the relationship includes assuming that the anomaly is a point mass or a combination of point masses.

6. The method of claim 2, wherein the relationship is determined by a computer model of geological structures.

7. The method of claim 1, further comprising estimating a mass of the anomaly based on the distance and the relationship, and based on at least one of the gravitational acceleration and the frequency shift.

8. The method of claim 7, wherein estimating the gravitational acceleration includes switching the measurement device from a clock configuration to a gravitational accelerometer configuration.

9. The method of claim 1, wherein the frequency shift is estimated relative to a reference frequency standard.

10. The method of claim 7, wherein the relationship is a functional relationship.

11. The method of claim 10, wherein the functional relationship is expressed by an analytical equation and at least one parameter of the equation is determined by the frequency shift at the at least one measurement location.

12. The method of claim 10, wherein the functional relationship is expressed by a table.

13. The method of claim 10, wherein deriving the functional relationship includes assuming that the anomaly is a point mass or a combination of point masses.

14. The method of claim 10, wherein the functional relationship is determined by a computer model of geological structures.

15. The method of claim 7, wherein calculating includes estimating one of the mass and the depth of the anomaly based on: another of the mass and the depth, and at least one of the gravitational acceleration and the frequency shift.

16. The method of claim 7, wherein estimating at least one of the mass ("M") and the depth ("r") is based on at least one of:

$$M = -\frac{a}{G}|\vec{r}|^2;$$

and $$M = -\frac{\Delta f}{f} \cdot \frac{|\vec{r}|c^2}{G},$$

wherein "a" is the acceleration, "$|\vec{r}|$" is a distance between the measurement location and the anomaly, "G" is a gravitational constant, "$\Delta f$" is the frequency shift, "f" is the oscillation frequency of the optical frequency standard, and "c" is vacuum speed of light.

17. The method of claim 1, wherein the at least one measurement location is a plurality of arrayed measurement locations above the formation, and each of the plurality of measurement locations is located at, above or below a surface location.

18. The method of claim 1, wherein the frequency standard oscillator assembly is configured as at least one of an atomic clock, an optical clock and a nuclear clock.

19. The method of claim 7, wherein the at least one measurement location is a plurality of arrayed measurement locations above the formation, and each of the plurality of measurement locations is located at, above or below a surface location.

20. The method of claim 7, wherein the frequency standard oscillator assembly is configured as at least one of an atomic clock, an optical clock and a nuclear clock.

21. A system for gravitational survey comprising:
a measurement device configured to be disposed in at least one measurement location to perform a gravitational survey of a subsurface earth formation as part of a subterranean exploration operation, the measurement device including a frequency standard oscillator assembly configured to oscillate at a stable frequency and a gravimeter configured to measure a gravitational acceleration, the frequency standard oscillator assembly including an optical frequency standard configured to emit an optical signal, the optical frequency standard being sensitive to potential energy within a gravitational field and having an oscillation frequency that shifts based on the potential energy, and a detector configured to detect the optical signal, the measurement device configured to measure the oscillation frequency of the optical frequency standard based on the optical signal and estimate a frequency shift of the oscillation frequency due to the potential energy; and
a processor for receiving the gravitational acceleration and a frequency shift of the frequency signal, and estimating a distance between the measurement location and a location of a formation anomaly based on a ratio between the frequency shift and the gravitational acceleration.

22. The system of claim 21, wherein estimating includes deriving a relationship between a mass of the anomaly and the distance based on the frequency shift, the relationship relating the frequency shift to a ratio between the mass and the distance.

23. The system of claim 22, wherein the relationship is a functional relationship expressed by an analytical equation and at least one parameter of the equation is determined by the frequency shift at the at least one measurement location.

24. The system of claim 22, wherein the relationship is a functional relationship expressed by a table.

25. The system of claim 22, wherein deriving the relationship includes assuming that the anomaly is a point mass or a combination of point masses.

26. The system of claim 22, wherein the relationship is determined by a computer model of geological structures.

27. The system of claim 21, wherein the processor is configured to estimate a mass of the anomaly based on the distance and the relationship, the gravitational acceleration and the frequency shift.

28. The system of claim 21, further comprising a reference frequency standard, the frequency shift being estimated relative to the reference frequency standard.

29. The system of claim 27, wherein calculating includes estimating one of the mass and the depth of the anomaly based on: another of the mass and the depth, and at least one of the gravitational acceleration and the frequency shift.

30. The system of claim 27, wherein estimating at least one of the mass ("M") and the depth ("r") is based on at least one of:

$$M = -\frac{a}{G}|\vec{r}|^2;$$

and $$M = -\frac{\Delta f}{f} \cdot \frac{|\vec{r}|c^2}{G},$$

wherein "a" is the acceleration, "$|\vec{r}|$" is a distance between the at least one measurement location and the anomaly, "G" is a gravitational constant, "$\Delta f$" is the frequency shift, "f" is the oscillation frequency of the optical frequency standard, and "c" is vacuum speed of light.

31. The system of claim 21, wherein the at least one measurement location is located at one of: a surface location, above a surface location and above the formation, and a combination thereof.

32. The system of claim 21, wherein the at least one measurement location is a plurality of arrayed measurement locations on, above or below a surface of the formation, and each of the plurality of measurement locations is located at, above or below a surface of the formation.

33. The system of claim 32, where the relationship is determined by a computer model of geological structures.

34. The system of claim 27, wherein the gravimeter utilizes one or more components of a clock that includes the optical frequency standard.

35. The system of claim 27, wherein the measurement device is configured to be switched from a clock configuration to an accelerometer configuration.

* * * * *